United States Patent Office 2,916,517
Patented Dec. 8, 1959

2,916,517
SEPARATION OF COMPOUNDS

Joseph Casella, Jr., Framingham, Mass., assignor to National Research Corporation, Cambridge, Mass., a corporation of Massachusetts No Drawing. Application July 25, 1957
Serial No. 674,020

5 Claims. (Cl. 260—586)

This invention relates to the production of chemicals and in particular to the separation of large-ring or macrocyclic ketones and alcohols.

A principal object of the present invention is to provide a method for the chromatographic separation of 1,9-cyclohexadecanedione, 9-hydroxycyclohexadecanone and 1,9-cyclohexadecanediol.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which is indicated in the claims.

For a fuller understanding of the nature and objects of the invention, reference should be had to the following detailed description.

Civetone or 9-cycloheptadecen-1-one of the following structure

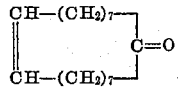

is a naturally occurring substance secreted by the civet cat. Due to its characteristic musk-like odor, it is of exceptional value to the perfume industry as a perfume base and fixative. Homologs of civetone having from 14 to 18 ring members also possess a musk-like odor very similar to that of the naturally occurring civetone. Although there are described in "Chemistry of Carbon Compounds," E. M. Rodd, Ed., New York, Elsevier Publishing Company, 1953, volume II, part A, pages 277–284, several syntheses for the perfumery fixative civetone, little attention has been given to the synthesis of civetone homologs such as 7-cyclotetradecen-1-one, 8-cyclohexadecen-1-one and 9-cyclooctadecen-1-one. One method for producing these civetone homologs, described in Swiss Patent 135,921 (1928) and U.S. Patent 1,873,154, involved the pyrolysis of the appropriate dibasic acids. This method is not particularly attractive as the yields of the macrocyclic monoketones are quite low and the syntheses of the requisite unsaturated dibasic acids are lengthy.

In U.S. Patent 2,790,005 there is described a process for the production of macrocyclic monoketones in good yields from symmetrical macrocylic diketones. The process of this patent comprises partially reducing a symmetrical macrocyclic diketone to the corresponding cyclic hydroxyketone and dehydrating the cyclic hydroxyketone obtained to the desired macrocyclic unsaturated monoketone. In general this reaction proceeds as follows:

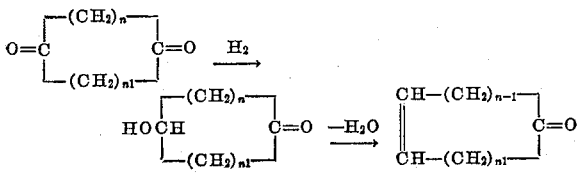

where $n$ and $n_1$ are whole numbers of from 6 to 8 and where $n$ and $n_1$ are numberically equal.

When the starting material is 1,9-cyclohexadecanedione, which may be prepared according to the methods described in U.S. Patent 2,584,664, there is obtained upon partial hydrogenation a mixture consisting of unreacted diketone starting material, the desired 9-hydroxycyclohexadecanone and the undesired 1,9 cyclohexadecanediol. Even though the partial hydrogenation is closely controlled to have but one ketone group of the cyclic diketone reduced to a secondary alcoholic grouping, some complete hydrogenation of the diketone occurs to produce the corresponding cyclic diols. In order to produce the valuable civetone homolog, 8-cyclohexadecen-1-one from 9 hydroxycyclohexadecanone it is necessary to separate the hydroxy ketone from the unreacted diketone and undesirable diol.

The method of the present invention comprises placing a solution of the mixed macrocyclic compounds, 1,9-cyclohexadecanedione, 9-hydroxycyclohexadecanone and 1,9-cyclohexadecanediol on a column packed with an adsorbent, and eluting with a suitable organic mixture until separation has been effected. In one preferred embodiment of the invention, the mixed macrocyclic compounds are dissolved in chloroform. In another embodiment the adsorbent is alumina and the eluant is a mixture of diethyl ether and benzene.

Specified detailed methods of practicing the present invention are set forth in the following non-limiting examples.

*Example 1*

An acetic acid solution of 10 grams of 1,9-cyclohexadecanedione was hydrogenated using 0.2 gram of prereduced Adams catalyst (finely divided platinum produced by the reduction of platinum oxide), until about 106 percent of one equivalent of hydrogen had been adsorbed. This reaction proceeded as follows:

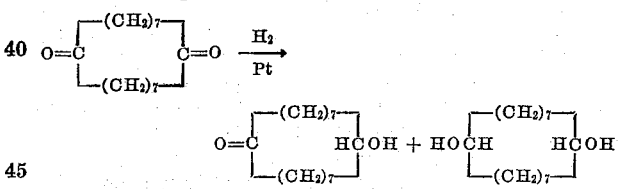

After separation of the catalyst and removal of the acetic acid in vacuo, there was obtained a residual solid.

Eight grams of the residual solid containing a mixture of the above three macrocyclic compounds were dissolved as completely as possible in 30 mls. of chloroform and poured gently into a column packed with 250 grams of alumina and 200 mls. of petroleum ether (B.P. 30° C.–60° C.). An eluant of 50% by volume diethyl ether— 50% by volume benzene was passed through the column at approximately 200 mls. per hour. Ten milliliter fractions were taken and were analyzed by removing the solvent and weighing the residues. For 190 mls. the residual weights remained below 10 mgs., then began to rise indicating a compound was coming through.

The first material obtained was a white waxy solid which when examined by infrared spectra, showed a trace of hydroxyl compound but in all other respects resembled the infrared curve of 1,9-cyclohexadecanedione. The residues decreased to virtually nothing and remained thus briefly, then began to increase rapidly. Relatively strong peaks at 2.75μ, 2.85μ, and 5.85μ in the infrared indicated both hydroxyl and carbonyl functions were present in this compound and in roughly equal amounts. Thus, the second peak was identified as 9-hydroxycyclohexadecanone. Again, the residues fell off but not as low as before. However, the material isolated in the residues changed physical character abruptly. Heretofore the waxy solids melted below 85° but now there appeared a white powdery solid which failed to melt. Since, 1,9-cyclohexadecanediol melts at 105°–106°, this change was taken to mean all the ketoalcohol had been removed and that the remaining material was all diol. The amounts of diol in each fraction increased slightly, then began to taper off slowly. The effluent or eluant was changed to 80% diethyl ether–20% benzene and 20 ml. fractions were taken until the residues shrunk to 5 mg. Analysis by infrared, revealed that only hydroxyl functions were present but no carbonyl, thus confirming the material as 1,9-cyclohexadecanediol. The entire chromatographic separation was carried out at room temperature (25° C.). The total weight of the material isolated from the eluants was 7.84 grams or 98% of the original charge.

*Example II*

The mixture of cyclic compounds, the column, and the amount of alumina were the same as in Example I. The column was packed and the cuts were analyzed in the same manner. A charge weighing 8.33 grams was mixed with 30 ml. of chloroform and placed on the column. A waxy solid was collected and identified as 1,9-cyclohexadecanedione. The weights dropped off to nothing, then increased as the 9-hydroxycyclohexadecanone came through the column. As the ketoalcohol petered out, the appearance of the diol was noted in the white powder which coated the flasks. The eluant was changed to 75% diethyl ether–25% benzene, and the cuts were increased to 50 ml. Diol was taken off until the residue decreased to 5 mg. Infrared spectra revealed no carbonyl present, only hydroxyl. The total weight of the recovered material was 7.96 grams or a 94.3% recovery.

Although the eluant is preferably a mixture of diethyl ether and benzene, a mixture of a petroleum ether and benzene can also be employed with the diethyl ether. The eluant mixture can contain various proportions of diethyl ether and benzene. However a 50–50 mixture has been found to give excellent results.

The separation can be hastened by changing the eluting mixture so as to contain a larger proportion of diethyl ether than benzene. For example, mixtures containing 70–80 percent by volume of diethyl ether and 30–20 percent by volume of benzene can be employed. However, the separation obtained using such mixtures is not as good as that obtained when using less diethyl ether. In the examples, the eluant mixture containing a high proportion of diethyl ether was employed after the separation of the three macrocyclic compounds had been accomplished and only the diol had to be recovered.

The preferred adsorbent is alumina but other adsorbents can be employed such as activated charcoals or carbons, fuller's earth, activated bentonites, talc, activated silicic acid, diatomaceous earth, silica gel, the anhydrous forms of the following substances: calcium sulfate, magnesium sulfate, copper sulfate, sodium sulfate, barium carbonate, calcium carbonate, calcium oxide, tricalcium phosphate, magnesium carbonate, magnesium citrate, magnesium oxide, magnesium trisilicate, titanium oxide, calcium silicate, sodium carbonate, zinc oxide, zirconium silicate, potassum carbonate and the like. Likewise, although the preferred solvent for the mixed macrocyclic compounds is chloroform, other organic solvents which will substantially dissolve all of the three components of the mixture can also be employed.

Since certain changes may be made in the above process without departing from the scope of the invention herein involved, it is intended that all matter contained in the above description shall be intepreted as illustrative and not in a limiting sense.

What is claimed is:

1. The method for mutually separating 1,9-cyclohexadecanedione, 9-hydroxycyclohexadecanone, and 1,9-cyclohexadecanediol from a mixture containing the same which comprises dissolving said mixture in chloroform, placing said chloroform solution on a column packed with a solid adsorbent, and eluting with a diethyl ether-benzene mixture until separation is effected.

2. The method for mutually separating 1,9-cyclohexadecanedione, 9-hydroxycyclohexadecanone, and 1,9-cyclohexadecanediol from a mixture containing the same which comprises dissolving said mixture in chloroform, placing said chloroform solution on a column packed with alumina as adsorbent and a petroleum ether, and eluting with a diethyl ether-benzene mixture until separation is effected.

3. The method for mutually separating 1,9-cyclohexadecanedione, 9-hydroxycyclohexadecanone, and 1,9-cyclohexadecanediol from a mixture containing the same which comprises dissolving said mixture in chloroform, placing said chloroform solution on a column packed with alumina as adsorbent and a petroleum ether, and eluting with a diethyl ether-benzene mixture until separation is effected, said eluting mixture containing at least 50 percent by volume diethyl ether.

4. The method of claim 3 wherein said eluting mixture contains 50 percent by volume diethyl ether and 50 percent by volume benzene.

5. The method of claim 3 wherein said eluting mixture contains at least 70 percent by volume diethyl ether.

References Cited in the file of this patent

UNITED STATES PATENTS 2,790,005    Blomquist et al. _____ Apr. 23, 1957